United States Patent
Polychronis

(10) Patent No.: US 10,432,497 B2
(45) Date of Patent: Oct. 1, 2019

(54) INJECTING CUSTOM CLASSES IN APPLICATION CODE TO FACILITATE NETWORK TRAFFIC MONITORING

(71) Applicant: SPLUNK INC., San Francisco, CA (US)

(72) Inventor: Konstantinos Polychronis, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 127 days.

(21) Appl. No.: 14/524,755

(22) Filed: Oct. 27, 2014

(65) Prior Publication Data

US 2016/0087868 A1    Mar. 24, 2016

Related U.S. Application Data

(60) Provisional application No. 62/053,025, filed on Sep. 19, 2014.

(51) Int. Cl.
    *H04L 12/26* (2006.01)

(52) U.S. Cl.
    CPC ............. *H04L 43/12* (2013.01); *H04L 43/08* (2013.01); *H04L 43/028* (2013.01); *H04L 43/14* (2013.01)

(58) Field of Classification Search
    USPC ........................................................ 709/224
    See application file for complete search history.

(56) References Cited

U.S. PATENT DOCUMENTS

| | | | |
|---|---|---|---|
| 6,351,847 B1† | 2/2002 | Sakamoto | |
| 7,366,790 B1 | 4/2008 | Rustad et al. | |
| 2003/0163602 A1* | 8/2003 | Johnson | G06F 9/542 719/328 |
| 2004/0031020 A1* | 2/2004 | Berry | G06F 11/3409 717/130 |
| 2005/0177845 A1 | 8/2005 | Patariu et al. | |
| 2005/0188241 A1 | 8/2005 | Cabezas et al. | |
| 2007/0011317 A1† | 1/2007 | Brandyburg et al. | |
| 2007/0237080 A1 | 10/2007 | Savagaonkar | |

(Continued)

OTHER PUBLICATIONS

Final Office Action dated Dec. 23, 2016 in U.S. Appl. No. 14/524,748, 14 pages.

(Continued)

*Primary Examiner* — Hermon Asres

(74) *Attorney, Agent, or Firm* — Shook, Hardy & Bacon, L.L.P.

(57) ABSTRACT

Various methods and systems for facilitating network traffic monitoring in association with an application running on a client device are provided. In this regard, aspects of the invention facilitate monitoring network traffic being transmitted to and/or from a client device, such as a mobile device, so that network performance can be analyzed. In various implementations, one or more default classes associated with an application on a device are replaced with one or more custom monitoring classes designed to facilitate monitoring data packets being communicated to or from the application. The custom monitoring classes can then be utilized to facilitate monitoring a plurality of data packets communicated to or from the application.

27 Claims, 7 Drawing Sheets

(56) References Cited

U.S. PATENT DOCUMENTS

| | | | |
|---|---|---|---|
| 2007/0248084 A1* | 10/2007 | Whitehead | H04L 63/1466 370/389 |
| 2008/0123854 A1* | 5/2008 | Peel | H04L 9/0894 380/277 |
| 2008/0229300 A1* | 9/2008 | O'Brien | G06F 8/656 717/168 |
| 2010/0039957 A1 | 2/2010 | Kotrla et al. | |
| 2011/0201364 A1* | 8/2011 | Capuozzo | H04W 24/10 455/466 |
| 2012/0011359 A1 | 1/2012 | Etheridge | |
| 2012/0069748 A1* | 3/2012 | Van Den Bogaert | H04W 24/10 370/252 |
| 2012/0233311 A1 | 9/2012 | Parker et al. | |
| 2013/0152050 A1* | 6/2013 | Chang | G06F 11/0742 717/125 |
| 2015/0058826 A1* | 2/2015 | Hu | G06F 11/362 717/128 |
| 2015/0358391 A1 | 12/2015 | Moon et al. | |

OTHER PUBLICATIONS

Non-Final Office Action dated May 5, 2017 in U.S. Appl. No. 14/524,748, 16 pages.

Notice of Allowance dated Sep. 19, 2017 in U.S. Appl. No. 14/524,748, 9 pages.

\* cited by examiner
† cited by third party

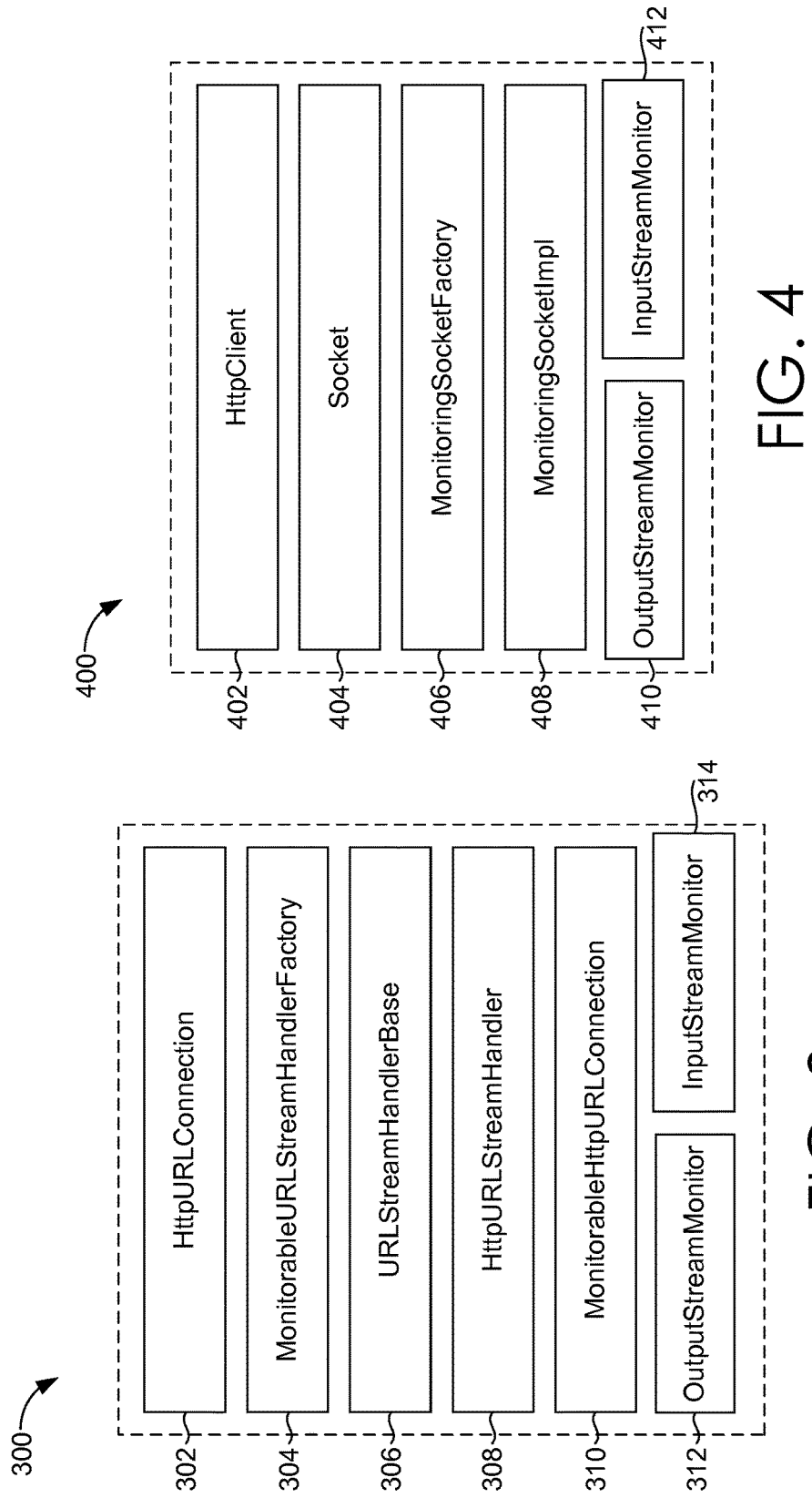

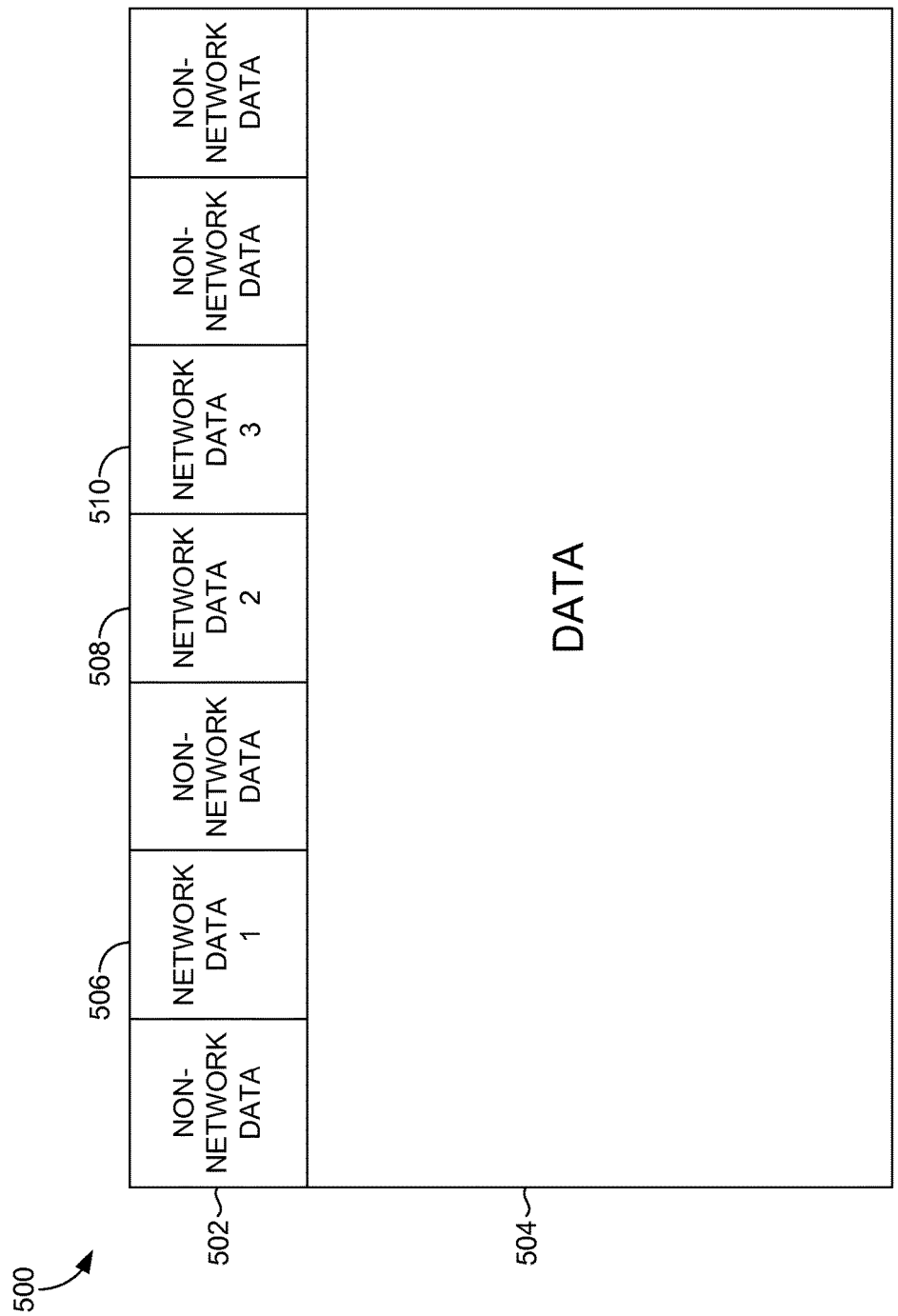

INJECTING CUSTOM CLASSES IN APPLICATION CODE TO FACILITATE NETWORK TRAFFIC MONITORING

CROSS-REFERENCE TO RELATED APPLICATIONS

This application claims the benefit of U.S. Provisional Patent Application No. 62/053,025, filed Sep. 19, 2014, entitled "Monitoring Network Traffic," which is incorporated by reference herein.

BACKGROUND

Data packets can be monitored in an effort to gain valuable insight as to network traffic in association with mobile devices, or applications thereof. In particular, monitoring network traffic associated with mobile devices can provide application developers with information that can be used to optimize application performance and troubleshoot various issues that may arise in connection with the application. With extensive amounts of data transmitted between mobile devices and various servers, however, monitoring such network traffic can be time consuming and thereby reduce device efficiency.

SUMMARY

Embodiments of the present invention provide methods and systems for monitoring network traffic in association with an application running on a client device. In this regard, aspects of the invention facilitate monitoring network traffic being transmitted to and/or from a client device, such as a mobile device or other electronic device, so that network performance can be analyzed. Various implementations are described that incorporate custom classes into an application running on a client device such that network traffic in association with the application can be monitored. At a high level, embodiments described herein inject a set of custom classes in the code of an application (e.g., a mobile application) that are used to facilitate network traffic monitoring. In embodiments, the classes can be included in the code of an application (e.g., mobile application) when the developer of the application is writing code for the application through a software developer kit (SDK). The application can then be made available as an executable program on a client device. When the application makes a network call (e.g., http network connection or call) to perform functionality supported by the application, for example, the custom classes can be utilized to effectuate network traffic monitoring.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 3 is a schematic showing a first set of classes used to implement network traffic monitoring, according to embodiments of the present invention;

FIG. 4 is a schematic showing a second set of classes used to implement network traffic monitoring, according to embodiments of the present invention;

FIG. 5 is an exemplary data packet, in accordance with embodiments of the present invention;

DETAILED DESCRIPTION

Figure 1:
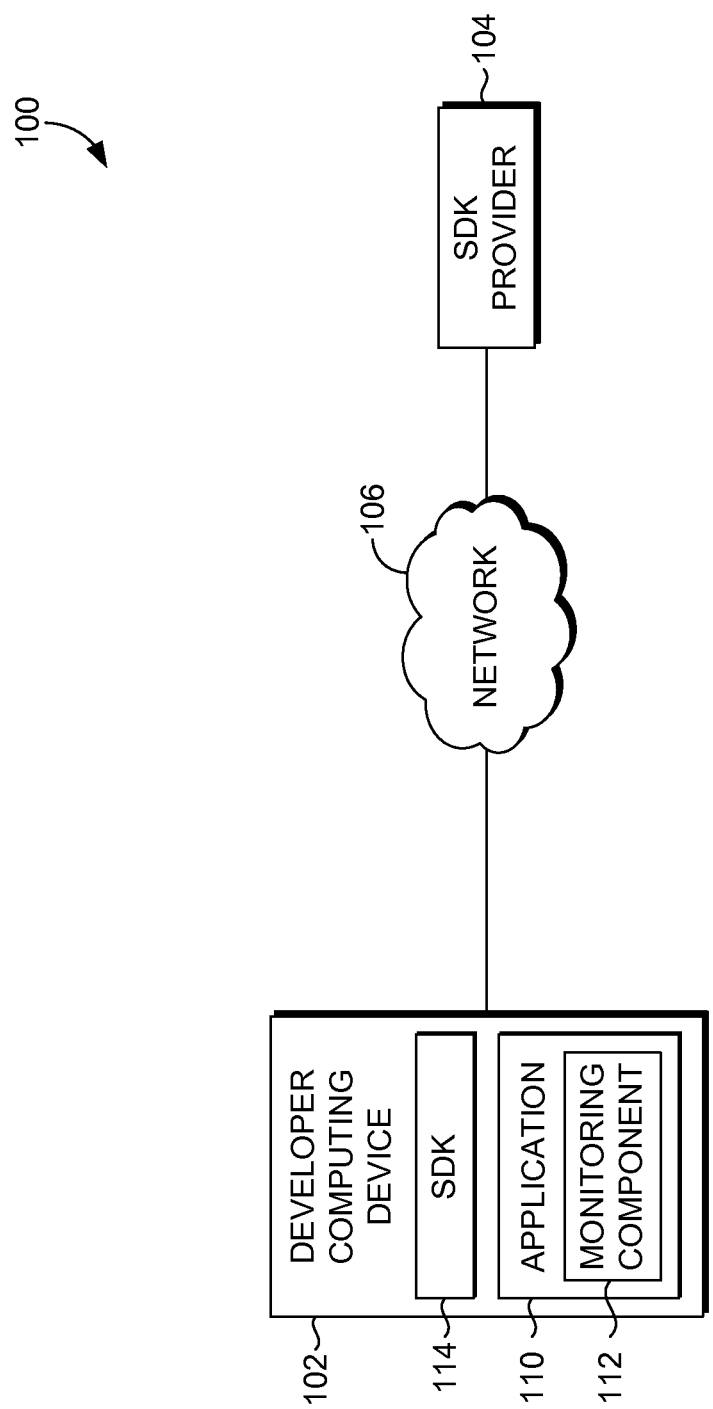
FIG. 1 is a block diagram showing a system for developing an application that includes network monitoring functionality, in accordance with embodiments of the present invention.

The subject matter of embodiments of the invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Network traffic can be monitored in an effort to gain valuable insight as to performance of an application running on a client device. In particular, monitoring data packets transmitted to and/or from client devices can provide application developers with information that can be used to optimize application performance, troubleshoot various issues that may arise in connection with the application, and/or generate or statistics or reports. Conventional network traffic monitoring systems exist in a non-mobile device environment and read or examine packets in their entirety, including the header and the payload, to monitor for network data. Reading both a header and a payload of a data packet, however, can be time consuming, particularly with extensive amounts of data packets transmitted between mobile devices and various servers. Further, reading such a large amount of bytes can impede the efficiency of the device. For example, in many cases, data within a payload offer little to no information that indicates performance of an application. In this way, reading the payloads of packets may unnecessarily utilize client device resources, such as memory.

Embodiments of the present invention provide methods and systems for monitoring network traffic in association with a computing device. In this regard, aspects of the invention facilitate efficient monitoring of network traffic received at or transmitted from a computing device, such as a mobile device, so that network data can be analyzed. In various implementations of monitoring network traffic described herein, packet headers of data packets are read to the extent necessary to obtain desired network data that indicate information about the network, which may indicate network performance. In this regard, upon obtaining desired network data from the packet header, the network traffic monitor can discontinue reading the current packet and proceed with reading a packet header of another packet. By limiting the amount of data bytes read in association with each packet, the device efficiency can be improved.

Further, embodiments described herein provide simple and efficient methods and systems for implementing such a network traffic monitor. In this manner, implementations are described that incorporate custom classes into an application running on a client device such that network traffic in association with the application can be monitored. At a high level, embodiments described herein inject a set of custom classes in the code of an application (e.g., a mobile application) that are used to facilitate network traffic monitoring. In embodiments, the classes can be included in the code of an application (e.g., mobile application) when the developer of the application is writing code for the application through a software developer kit (SDK). The application can then be made available as an executable program on a client device. When the application makes a network call (e.g., http network connection or call) to perform functionality supported by the application, for example, the custom classes can be utilized to effectuate network traffic monitoring.

Initially, with respect to FIG. 1, FIG. 1 illustrates an exemplary computing environment 100 for developing an application that includes network monitoring functionality, in accordance with embodiments of the present invention. The environment 100 is an example of one suitable environment. The environment 100 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within the infrastructure.

The environment 100 may include developer computing device 102, SDK provider 104, and network 106. The network 106 may include, without limitation, one or more local area networks (LANs) and/or wide area networks (WANs). Such networking environments are commonplace in offices, enterprise-wide computer networks, intranets and the Internet. Accordingly, the network 106 is not further described herein.

Any number of developer computing devices and SDK providers may be employed in the environment 100 within the scope of embodiments of the present invention. Each may comprise a single device/interface or multiple devices/interfaces cooperating in a distributed environment. For instance, the developer computing device 102 may comprise multiple devices and/or modules arranged in a distributed environment that collectively provide the functionality of providing content to client devices. Additionally, other components/modules not shown also may be included within the environment 100.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. In particular, other arrangements may support scalable implementations of embodiments of the present invention. The infrastructure 100 can be scalable to support the ability to be enlarged to accommodate growth.

Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 2:
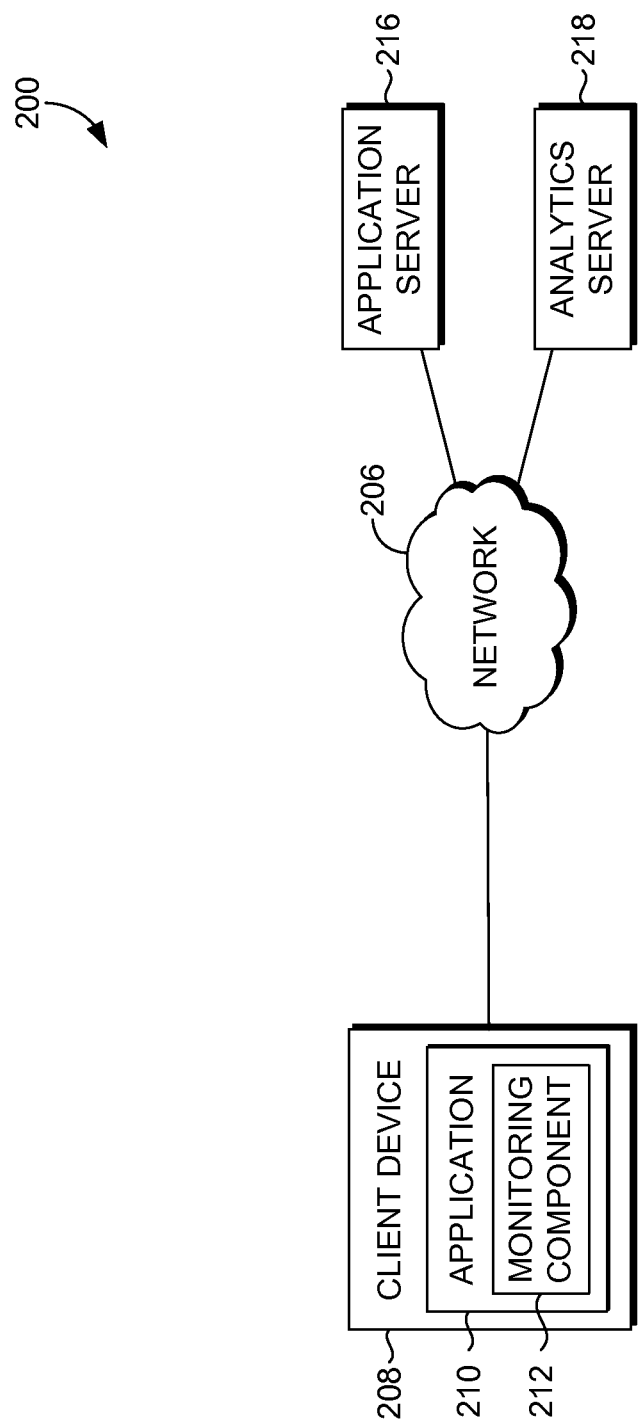
FIG. 2 is a block diagram showing a system for facilitating monitoring of network traffic, in accordance with embodiments of the present invention.

The developer computing device 102 is configured for use in developing or generating an application(s) that can be distributed to various client devices, such as client device 208 of FIG. 2. In this manner, a developer can utilize the developer computing device 102 to develop application 110. An application refers to a computer program that enables content to be provided to a user. An application may be a mobile application or any other application that is executable via a client device. An application can provide or be related to any type of content, such as, for example, email, calendar, contacts, stock market, sports, weather information, social networking, games, etc.

In accordance with embodiments described herein, the application 110 incorporates or includes a monitoring component 112. At a high level, the monitoring component 112 is a software component that facilitates monitoring network traffic flowing to and/or from client devices when the application is installed on the client devices. In embodiments, the monitoring component 112 is a plug-in, extension, or add-on (generally referred to herein as a plug-in). A plug-in refers to a software component that adds a specific feature or set of features to an existing software application or a software application being developed. An application that supports plug-ins can enable customization of the application.

The monitoring component 112 can operate using a set of custom monitoring classes that facilitate network traffic monitoring. A set of custom monitoring classes are executable code of the monitoring component that support monitoring network traffic. A class refers to an extensible program-code-template for creating objects, providing initial values for state, and implementations of behavior. In this way, a class is a template or pattern in code that defines methods to generate a particular object and behaviors thereof. A custom class refers to a class that is customized or generated to perform a specific functionality that may be unique from a default or native class. A default or native class refers to a class originally developed for implementation. A default or native class may be designed by, for instance, a platform on which an application may run, such as Android™, iOS®, and Windows Phone®, to name a few. A custom monitoring class is a class that is customized or generated to facilitate performance of a monitoring aspect as described herein.

It is contemplated that custom monitoring classes can be incorporated in the application 110 as a monitoring component or plug-in via a software development kit (SDK), for instance. In such a case, a software development kit (SDK) 114 can be downloaded, for example, from SDK provider 104 via network 106. Although FIG. 1 illustrates a SDK provider 104 to provide SDK 114 to the developer computing device 102, it can be appreciated that any other means can be used to obtain an SDK at the developer computing device 102.

The SDK 114 can include the custom monitoring classes that can be incorporated into the application 110 as the monitoring component 112. In this manner, a custom class or set of custom classes can be provided (e.g., via a library) through a software development kit (SDK) environment in which the developer of the application 110 writes the corresponding code. When the code is converted to an executable application, the set of custom classes can become part of the application itself. In some cases, a custom class or set of custom classes are generated and offered (e.g., via an SDK) by a developer or provider of an analytics service, such as a service provided by analytics server 218 of FIG. 2. In such cases, the analytics service provider can use custom classes to facilitate or control monitoring of network traffic to identify network data that can be used to analyze application performance.

In embodiments, the custom monitoring classes can be incorporated into the application 110 via code, such as one line of code, that calls the monitoring component 112. In this regard, custom monitoring classes can become accessible via a library, for example. As such, using the developer computing device 102, a developer of the application 110 can add a single line of code into the application code that is used to trigger the monitoring component 112 (e.g., set of custom monitoring classes) during execution of the application. A single line of code is advantageously used instead of requiring a developer to incorporate into their code several different lines of code at multiple portions of the developer's application code. As such, rather than a developer searching the entire application code and replacing code where necessary to effectuate network traffic monitoring, a single line of code can be used to trigger such monitoring. Code that triggers the monitoring component may be referred to herein as a monitor trigger. Code triggering the monitoring component 112 may be added or incorporated into any aspect of the application code. For instance, a monitor trigger may be included at or near the beginning of the executable code of the application 110 such that the monitoring component 112 is initiated or triggered as the application is launched or started.

By way of example only, and without limitation, a developer using the developer computing device 102 to develop an application may download an SDK that facilitates monitoring of network traffic in association with the application. The SDK may be downloaded from a provider of an analytics service, such as a provider associated with analytics server 218 of FIG. 2 that analyzes network data to report application performance. The SDK may include monitoring operations, including a set of custom monitoring classes that, in implementation, facilitate monitoring of network traffic at client devices. To call the monitoring operations or functionality during execution of the application at a client device, the developer may provide a monitor trigger, such as a line of code, within the code of the application. For example, a monitor trigger may be provided at the initialization of the application such that the monitoring component is called as the application is opened, activated, or initialized at a client device. The developer operating the developer computing device 102 can then make the application executable such that the application, along with the monitoring component associated therewith, can be downloaded and executed at client devices.

Upon developing the application 110 that incorporates monitoring operations, via monitoring component 112, the application can be distributed to various client devices, such as client device 208 of FIG. 2. Applications can be distributed to client devices in any manner. In some cases, the application may be distributed to a client device directly from the developer computing device 102. In other cases, the application may be distributed to a client device via an application marketplace or other application distribution system. For instance, an application marketplace or other application distribution system might distribute the application to a client device based on a request from the client device to download the application.

Turning now to FIG. 2, an example analytics infrastructure ("infrastructure") 200, in which embodiments of the present invention may be performed, is shown. The infrastructure 200 is an example of one suitable infrastructure. The infrastructure 200 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within the infrastructure.

The infrastructure 200 may include client device 208, application server 216, analytics server 218, and network 206. The network 206 may include, without limitation, one or more local area networks (LANs) and/or wide area networks (WANs). Such networking environments are commonplace in offices, enterprise-wide computer networks, intranets and the Internet. Accordingly, the network 206 is not further described herein.

Any number of client devices, application servers, and analytics servers may be employed in the infrastructure 200 within the scope of embodiments of the present invention. Each may comprise a single device/interface or multiple devices/interfaces cooperating in a distributed environment. For instance, the application server 216 may comprise multiple devices and/or modules arranged in a distributed environment that collectively provide the functionality of providing content to client devices. Similarly, the analytics server 218 may comprise multiple devices and/or modules arranged in a distributed environment that collectively provide the functionality of performing analytics. Additionally, other components/modules not shown also may be included within the infrastructure 200.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. In particular, other arrangements may support scalable implementations of embodiments of the present invention. The infrastructure 200 can be scalable to support the ability to be enlarged to accommodate growth.

Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client device 208 may include any type of computing device, such as computing device 900 described below with reference to FIG. 9, for example. The client device 208 might take on a variety of forms, such as a personal computer (PC), a laptop computer, a mobile phone, a smartphone, a smartwatch, a tablet computer, a wearable computer, a personal digital assistant (PDA), a server, an MP3 player, a global positioning system (GPS) device, a video player, a handheld communications device, a workstation, any combination of these delineated devices, or any other suitable device. Generally, the client device 208 can provide access to different content, for instance, content provided via various applications, such as application 210. In this regard, content can be provided to the client device 208 from an application server (e.g., application server 214) accessible via a network (e.g., network 206) such as the Internet or a private local area network.

As illustrated in FIG. 2, the client device 208 has application 210 installed thereon. The application 210 can be obtained from an application developer, such as developer computing device 102 of FIG. 1. In other cases, the application may be obtained via an application marketplace or other application distribution system. For instance, the client device 208 might download application 210 from an application marketplace or other application distribution system.

The application, via the client device 208, communicates with the application server 216 to exchange information (e.g., content, data, etc.) therebetween. The application server 216 is generally configured to store, process, and deliver content to client devices, such as client device 208. The communication between client device 208 and the application server 216 may take place using, for example, the Hypertext Transfer Protocol (HTTP) or Hypertext Transfer Protocol Secure (HTTPS). Content delivered from the application server 216 to the client device 208 might be HTML documents, which may include images, style sheets and scripts in addition to text content. Any other type of content (e.g., audio, video, etc.) is contemplated within the scope of embodiments of the present invention, and HTML documents are provided only as an example. As can be appreciated, in addition to delivering content to client devices, various request and response packets can also be communicated between client devices and the application server. For example, generally, an application residing on a client device initiates communication with a corresponding application server by making a request for a specific resource (e.g., using HTTP), and the application server responds with the appropriate content.

With reference to the application 210 running on the client device 208, the application 210 includes a monitoring component 212, such as a plug-in, that is used to facilitate monitoring of network traffic in association with the application 210. In this regard, the monitoring component 212 may utilize classes, such as custom monitoring classes, to implement monitoring of data packets to and/or from the application 210.

At a high-level, the monitoring component 212 facilitates monitoring data packets transmitted to and/or from an application server(s) (e.g., application server 216). In particular, the incoming and/or outgoing data packets are read or examined to identify network data contained within the packet, generally the packet header, that indicate network performance. Monitoring network traffic enables information to be gathered particular to the network performance associated with an application or set of applications. Network data refers to any type of data that indicates information about the network and/or network performance. Network data may be, for instance, a URL, a connection type (http, https, etc.), connection start time, connection end time, http status code, request length, response length, request headers, response headers, or the like. Upon obtaining network data indicating performance of the network, the network data can be provided to the analytics server 108 for analyzing performance of the corresponding application.

In one implementation, monitoring component 212 is invoked upon launching the application 210. The application 210 may be launched or invoked in any manner, such as, for example, upon user selection of the application 210 via an interface of the client device 208. As another example, application 210 might be remotely launched (e.g., via a remote computer) by a developer or an administrator to cause monitoring. In accordance with initiating execution of the application 210, the monitoring component 212 may be triggered or initiated. By way of example, and without limitation, monitor trigger code (e.g., one line of code) may be included in the application 210 to call the monitoring component 212. In this regard, when the instructions in the application program call or reference the monitoring component 212, such as a monitoring plug-in, during run time of the application 210 at the client device 208, the monitoring component 212 is triggered or initiated. For instance, a monitoring plug-in may be initiated at start up or initialization of the application 210 via a single line of code invoking such a plug-in. In some cases, the monitoring component 212 may run in parallel or concurrent with other functionality provided by the application 210 in which the monitoring component 212 is incorporated.

In accordance with the monitoring component 212 being initiated at the client device 208, the monitoring component 212 can listen for or detect a particular event or functionality that causes or initiates network traffic monitoring to begin. In embodiments, the monitoring component might listen for a network connection event, such as initiation of an http connection or http call. An HTTP connection/session is a sequence of network request-response transactions. For instance, the client device 208 may initiate a request by establishing a Transmission Control Protocol (TCP) connection to a particular port on a server. An HTTP server listening on that port waits for a request message. Upon receiving the request, the server sends back a status line, such as "HTTP/1.1 200 OK," and a message of its own. A particular event(s) or functionality(s) that may trigger network traffic monitoring, however, may be any aspect of the application 210 and is not limited to a network connection event described herein.

In some cases, because multiple sets of default classes may potentially be utilized, the monitoring component 212 may be configured to listen for multiple events. That is, the monitoring component 212 may be initiated by calling one of a plurality of different possible classes. For example, the monitoring component 212 might wait for a first class used to initiate a network connection (e.g. HttpURLConnection) and/or a second class used to initiate a network connection (e.g., HttpClient), either of which may be called via an application. Further, once initiated, any number of classes called might be monitored (e.g., call HttpURLConnection for one aspect and then call HttpClient for another aspect).

Based on detection of a predetermined event, such as initiation of an http connection, the monitoring component 212 may activate network traffic monitoring. In this regard, a set of custom monitoring classes associated with the monitoring component 212 may be executed or run to prompt network traffic monitoring. As such, custom monitoring classes specifically designed to facilitate network traffic monitoring can be used or called as opposed to default or native classes conventionally used by an application to establish a connection with a remote server. For instance, the Android™ platform provides native java classes that can be used to make http calls. Rather than using such native classes, one or more custom monitoring classes can be called to facilitate network traffic monitoring. In particular, and as described in more detail below, the network monitor class is used to perform the network monitoring. Additional custom monitoring classes can also be used, however, to initiate or proceed to the network monitor class. In other words, a set of custom monitoring classes can be used to sequentially replace the processes used to arrive at the network monitor class.

Reflection may be employed to implement custom monitoring classes. Reflection refers to the ability of a computer program to examine (e.g., type introspection) and modify the structure and behavior (specifically the values, metadata, properties and functions) of the program at runtime. In some embodiments, to execute the set of custom monitoring classes, a custom class or series of custom classes can be called via a native class. In this manner, a native class initially called to initialize a network connection (e.g., HttpURLConnection) can refer to, designate, or call a custom monitoring class. As such, a native class is initially called with one or more custom monitoring classes being called therefrom. For instance, a call to a custom monitoring class might be injected into a default class used to initiate a network connection so that the custom monitoring class is called via the original, default class. As such, upon identifying a functionality specified to trigger utilization of a custom set of monitoring classes (e.g., a network connection), a reference to a first custom monitoring class to be utilized can replace a reference to a default custom class. As a specific example, upon detecting initialization of an http connection, a default class generally called from the http connection initialization can be replaced with a custom monitoring class. In some cases, calls to multiple custom monitoring classes can replace default classes at such a time. In other cases, upon a call being redirected from a default class to a custom monitoring class, such a custom monitoring class may then refer to or call another custom monitoring class, and so forth. As such, additional custom monitoring classes can sequentially be called until the network monitor class, which performs network monitoring as described herein, is executed. Advantageously, functionality of the custom classes can be integrated with native classes such that it obviates the need for the developer to generate a complete set of custom classes. Specifically, the routines and procedures associated with the native classes are maintained, at least in part, so that custom classes are incorporated as needed to provide the monitoring functionality.

By way of example only, and with reference to FIGS. 3 and 4, each of FIGS. 3 and 4 illustrate a set of classes used to facilitate monitoring of network traffic, in accordance with embodiments described herein. Initially, with respect to FIG. 3, FIG. 3 illustrates a set of classes that may be used in an Android™ platform implementation in which an HttpURLConnection class 302 is used to initiate an http connection. The HttpURLConnection class 302 is a native class provided via the Android™ platform. Generally, the HttpURLConnection class 302 creates a connection to a remote server using HTTP protocol. The HttpURLConnection class 302 may be described as an URLConnection for HTTP that is used to send and receive data over the web. Data may be of any type and length. This class may be used to send and receive streaming data whose length is not known in advance.

In accordance with embodiments described herein, although the initial class called to create a connection to a remote server is a default class, the monitoring class MonitorableURLStreamHandlerFactory 304 called by HttpURLConnection class 302 is a custom monitoring class. The MonitorableURLStreamHandlerFactory 304 may be called via an implementation using reflection, as described herein. The custom monitoring class MonitorableURLStreamHandler Factory 304 may provide functionality similar as to that provided by a default class, such as URLStreamHandlerFactory, for instance. The default class, URLStreamHandlerFactory, generally defines a factory which creates an URLStreamHandler for a specified protocol. It may used by the class URL. As such, the custom monitoring class MonitorableURLStreamHandlerFactory 304 can define a factory which creates an URLStreamHandlerBase 306, which is also a custom monitoring class. The custom monitoring class URLStreamHandlerBase 306 may provide functionality similar as to that provided by a default class, such as URLStreamHandler. URLStreamHandler is the base for all classes which can handle the communication with a URL object over a particular protocol type. As such, the custom monitoring class URLStreamHandlerBase 306 may handle communication with a URL object of a particular protocol type. The URLStreamHandlerBase 306 can call HttpURLStreamHandler 308, which is also a custom monitoring class. The HttpURLStreamHandler 308 may provide functionality similar as to that provided by a default class, such as HttpURLStreamHandler. The HttpURLStreamHandler 308 may return an instance of class MonitorableHttpURLConnection 310. The MonitorableHttpURLConnection 310 can use a decorator pattern to decorate the encapsulated URL connection. The MonitorableHttpURLConnection 310 can function to call the OutputStreamMonitor 312 or InputStreamMonitor 314, as appropriate, such that network traffic can be monitored. In some cases, the MonitorableHttpURLConnection 310 wraps the streams of encapsulated URLConnection using OutputStreamMonitor 312 or InputStreamMonitor 314 and returns the wrapped object. As such, calls for reading or writing data to the URLConnection's stream are intercepted and monitored.

FIG. 4 illustrates a set of classes that may be used in an Android™ platform implementation in which an HttpClient 402 class, which is a default class, is used to initiate a network connection. As illustrated, the HttpClient 402 class can call a Socket 404 class, which is also a default class. Sockets are represented by class Socket. Thereafter, the socket 404 class can initiate a custom class, namely, MonitoringSocketFactory 406 class, which creates instances of MonitoringSockettlmpl 408 class. The MonitoringSockettlmpl 408 class may be a dynamically decorated implementation of a default class, such as PlainSocketlmpl. MonitoringSockettlmpl 408 class can function to call the OutputStreamMonitor 410 or InputStreamMonitor 412, as appropriate, such that network traffic can be monitored.

As can be appreciated, any custom class, or set of custom classes, can be implemented using a delegation pattern and/or a decorator pattern to facilitate network traffic monitoring. For example, a decorator pattern and/or delegation pattern can be used to modify the network monitor class (e.g., network monitor class) to perform monitoring operations. A delegation pattern refers to a design pattern in object-oriented programming where an object, instead of performing one of its stated tasks, delegates that task to an associated helper object. The decorator pattern allows adding behavior to an object. As such, the decorator pattern can build on top of an existing object by adding functionality. The delegation and/or decorator pattern can be used to encapsulate existing implementation of classes used for network communication. For instance, the network monitor class might use a decorator pattern.

As previously described, the monitoring component 212 includes network monitoring functionality that is utilized during operation of the application 210. A network monitor or network monitor functionality is generally described herein as being performed by a network monitor class. Although the network monitor functionality is generally described herein as being performed by a single class, namely, a network monitor class, such functionality can be implemented via multiple custom classes. For example, one custom class may be used to monitor outgoing data packets, while another custom class may be used to monitor incoming data packets. Irrespective of a number of classes employed to perform the functionality described herein with respect to the monitoring functionality, the custom class or the collective custom classes may be referred to herein as the network monitor or network monitor class.

The network monitor or network monitor class may be incorporated into the application 210 in any number of ways. The method employed to incorporate or provide the network monitor described herein is not intended to limit the scope of embodiments of the present invention. Further, although the monitoring component 212, including the network monitor, is generally described herein as being incorporated into the application 210, as can be appreciated, such network monitoring may operate independent of an application or set of applications for which network traffic is being monitored. For example, the network monitor described herein may be implemented as a stand-alone application (e.g., on the client device or remote therefrom) in communication with the application 210.

The network monitor or network monitor class generally facilitates monitoring of incoming and/or outgoing network traffic. In this manner, the monitoring functionality monitors incoming and/or outgoing data packets, such as http packets or https packets. Data packets flowing from the application 210 to the application server 216 can be read for network data prior to being transmitted to the application server 216. Similarly, data packets flowing from the application server 216 to the application 210 can be read for network data.

The network monitor causes incoming or outgoing packets to be read or examined to identify network data contained therein. In accordance with embodiments generally described herein, the packets are read to the extent necessary to identify network data associated therewith. To this end, examination of data packets is limited to the extent needed to obtain desired network data. Network data may include, by way of example and without limitation, a URL, a connection type (e.g., http, https, etc.), a connection start time, a connection end time, an http status code, a request length, a response length, a request headers, a response headers, error detection codes, sequencing information, length of packet, synchronization, packet number, protocol, etc.

Generally, a data packet includes a header and a payload. Headers often contain instructions or metadata about the data carried by the packet (payload), such as size of the payload. As the header generally includes network data that indicate information about the network, which may indicate performance of the network, the network monitor is configured to cause reading or examining of the header to gather network data. In one implementation, when monitoring a data packet, the header is read until the desired network data are obtained. Thereafter, examining the remaining unread portion of the header as well as the payload can be dismissed or ignored. As such, upon identifying the desired network data, any further examination of the data packet can be avoided and the next data packet can be monitored.

In some cases, upon exhausting examination of the entire header without having obtained all the desired network data, any further monitoring of the data packet (e.g., the payload) can be omitted in an effort to facilitate an efficient network traffic monitoring. In such cases, further monitoring of the packet payload does not occur and the packet can continue on for typical processing of the packet, for example, by the application 210 and/or the application server 216.

In other cases, upon exhausting examination of the entire header without having obtained all the desired network data, a determination may be made as to whether packet size (e.g., size of payload) is a particular network data remaining to be detected. In other words, upon completion of reading a packet header with one or more network attributes not having been identified within the header, it can be determined whether one of the unidentified network data is the packet size. If the remaining unidentified network data are not related to the packet size, examination of the packet may cease such that the payload is not read. As such, monitoring of another data packet can proceed. Any of the unidentified network data may be reported as a null, unknown, or zero value, or any value used to designate an unidentified network data. On the other hand, if packet size is one of the unidentified network data existing upon completion of reading the packet header, examination of the payload may proceed to obtain or calculate the size of the packet.

By way of example, and with reference to FIG. 5, FIG. 5 illustrates an example data packet 500 that might be read by a network monitor. As illustrated in FIG. 5, the data packet 500 includes a header portion 502 and a payload portion 504. The header portion 502 can include any amount or type of data. Such data may generally contain instructions about the data carried by the packet (via the payload portion 504). The header portion 502 may include network data, such as a URL, a connection type, a connection start time, a connection end time, a http status code, a request length, a response length, or the like. For purposes of this example, assume that the header portion 502 of the data packet 500 being read includes a first type of network data 506, a second type of network data 508, and a third type of network data 510.

In some implementations, the entire header portion 502 may be read without reading any data provided in the payload portion 504 irrespective of the network data contained in the header portion 502. In other implementations, the header portion 502 may be read only until each of a desired set of network data is collected. For example, assume that a network monitor is configured to collect a set of network data that includes a first type of network data, a second type of network data, and a third type of network data. In such a case, the network monitor may read the header and identify a first network data 506, a second network data 508, and a third network data 510. Upon recognizing that each of the desired network data types have been read, the network monitor can cease reading the header.

As another example, assume that a network monitor is configured to collect a set of network data that includes a first type of network data, a second type of network data, a third type of network data, and a fourth type of network data. Accordingly, the network monitor may read the entire header portion 502 but fall short of collecting the fourth type of network data. In some implementations, the network monitor may proceed with reading the next packet header without any further reading of the current packet. In other implementations, a determination might be made as to whether any of the first network data 506, second network data 508, or third network data 510 is a particular type of data, such as packet size. If not, the network monitor may proceed with reading the next packet without any further reading of the current packet. If so, the network monitor may proceed with reading the data portion 504 to collect, determine, or calculate the desired type of data.

Although the network monitor is generally described herein as reading packet headers, as can be appreciated, the network monitor can alternatively or additionally read packet trailers in some embodiments. To this end, a packet trailer may be read to a similar extent as described above with respect to the packet header.

Various implementations may be employed to determine when to discontinue reading the packet header. In some cases, a set of particular network data may be desired. In such cases, when each of the network data is captured, reading the packet header can be discontinued. As can be appreciated, any number of network data can be included in a set of network data desired to be captured. Further, the number and specific set of network data may vary, for example, based on selection by a developer of an application, based on a time of day, etc.

In some cases, the monitoring component 212 may track the number of incoming bytes or kilobytes for each packet for use in determining when to cease reading the packet. That is, the number of incoming bytes for a packet is used to indicate when to complete reading the header. The number of incoming bytes in data can be used to increase a counter to indicate a number of bytes to read and parse. Counting the number of incoming bytes indicates the actual length of the data in a queue thereby providing a marker to discontinue reading bytes. By way of example, assume that five incoming kilobytes are identified. As such, a counter is increased from zero to five. Thereafter, in reading the incoming packet header, the network monitor reads from zero to five kilobytes. Further assume that another five incoming kilobytes are identified. In such a case, the counter is increased from five to ten. In reading the packet header, the network monitor reads from zero to ten kilobytes.

Upon obtaining network data that indicate network traffic in association with an application 210, the network data can be stored at the client device 208 and/or communicated to the analytics server 218 for processing. Alternatively or additionally, data processing may occur at the client device 208. As can be appreciated, the network data can be stored at the client device 208 and communicated to an analytics server 218 at any time, such as immediately, upon a time delay, in accordance with an occurrence of an event, etc.

The analytics server 218 facilitates the discovery and communication of meaningful patterns in data. In particular, the analytics server 218 may operate with additional components and modules in the infrastructure 200 to perform analytics based on monitored network traffic. In accordance with aspects of the present invention, the analytics server 218 can obtain various types of data, including network data identified and captured at various client devices. Such data can be analyzed and used to provide, determine, or calculate network metrics. To this end, various network data captured at client devices can be communicated to the analytics server 218 at which network metrics can be calculated therefrom.

A network metric refers to any type of measurement used to indicate or gauge some quantifiable component of data related to network performance. Network performance refers to measures of service quality of a communication-based application or server. By way of example, and without limitation, a network metric may be a type of measurement related to network performance, such as latency associated with a client device, latency associated with an application, latency associated with a set of applications developed by a particular application provider, etc. Other network metrics may include bandwidth (maximum rate that information can be transferred, commonly measured in bits/second); throughput (actual rate that information is transferred); latency (delay between the sender and the receiver decoding it—generally a function of the signals travel time and processing time at any nodes the information traverses); jitter (variation in the time of arrival at the receiver of the information); and error rate (number of corrupted bits expressed as a percentage or fraction of the total sent).

In some cases, the analytics server 218 might provide network data as a network metric to an application developer or provider (e.g., at the developer computing device 102 of FIG. 1). In other cases, network data might be used to determine or calculate a network metric(s). Further, network data used to calculate metrics may include data that is not directly identified via a header. For example, a response time network metric may be calculated from the difference in time between an input and output stream. In such a case, a table might be used to monitor open connections. When the connection closes, a response time can be calculated. Although the analytics server 218 is generally discussed as generating network metrics, any component can determine network metrics, including the client device 208.

Upon generating network metrics, a set of network metrics can then be communicated to an application developer or provider so that the application developer can utilize such information to optimize and/or resolve issues associated with an application(s). For example, the analytics server 218 may obtain network data indicating network performance in relation to a particular mobile application running on any number of mobile devices. The captured network data can be analyzed and/or reported to the mobile application developer or provider (e.g., via developer computing device 102 of FIG. 1 or other device accessible by a developer) such that the mobile application developer is informed in relation to network performance associated with the mobile application. In various implementations, the analytics server 218 may report network metrics associated with network traffic related to a specific application, a set of applications (e.g., applications provided by a specific application developer), client devices having a particular application installed thereon, etc.

Embodiments of the present invention may be implemented via a cloud computing platform. In particular, a scalable implementation can be implemented using a cloud computing platform that comprises components described herein in a distributed manner. A cloud computing platform may span wide geographic locations, including countries and continents. The cloud computing platform may include nodes (e.g., computing devices, processing units, or blades in a server rack) that are allocated to run one or more portions of the components of the present invention. Components may be partitioned into virtual machines or physical machines that concurrently support functional portions such that each functional portion is able to run on a separate virtual machine.

Figures 6, 7:
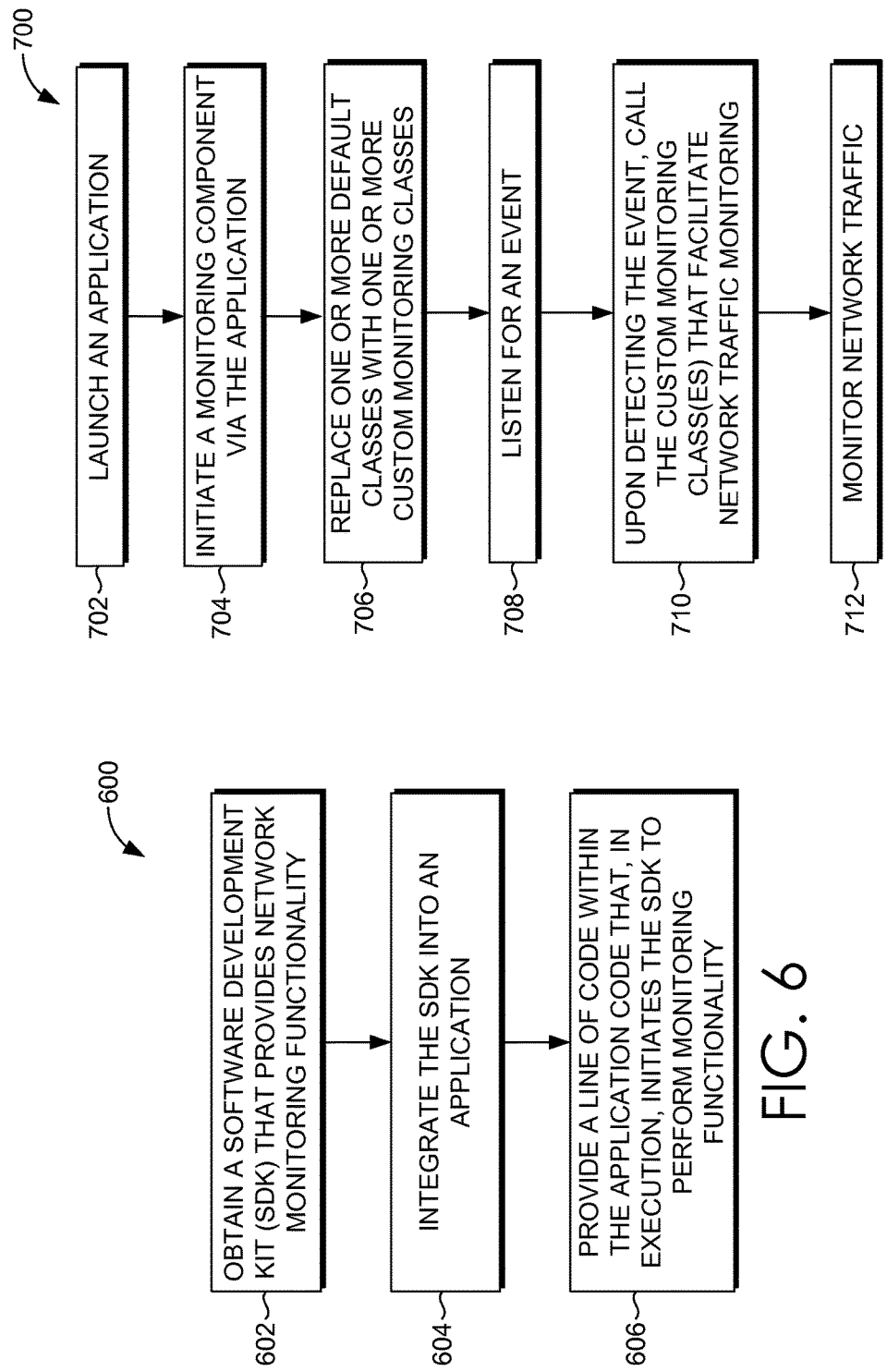
FIG. 6 is a flow diagram showing a method for generating an application that includes network monitoring functionality in accordance with an embodiment of the present invention.
FIG. 7 is a flow diagram showing a method for initiating custom monitoring classes in accordance with an embodiment of the present invention.

With reference now to FIG. 6 a flow diagram is provided that illustrates a method 400 for generating an application that includes network monitoring functionality in accordance with an embodiment of the present invention. Such an implementation may be performed at a developer computing device, such as developer computing device 102 of FIG. 1. Initially, at block 602, a software development kit that provides network monitoring functionality is obtained. For example, a software development kit might be downloaded from an entity that utilizes data obtained in accordance with performing network monitoring functionality. At block 604, the software development kit is integrated with an application generated or being generated. For example, one or more custom monitoring classes, such as a network monitor class, can be integrated with the application. At block 606, a line of code is provided within the application code to point to or initiate the SDK to perform monitoring functionality.

With reference now to FIG. 7, a flow diagram is provided that illustrates a method 700 for initiating custom monitoring classes in accordance with an embodiment of the present invention. Such a method may be implemented at a client device, such as client device 208 of FIG. 2. Initially, at block 702, an application is launched. Thereafter, at block 704, a monitoring component, such as a plug-in is initiated via the application. In some embodiments, a monitoring component is initiated in accordance with launching the application. Thereafter, at block 706, one or more default classes are replaced with one or more custom monitoring classes. At block 708, the monitoring component listens for an event, such as a network connection initiation. Upon detecting the event, one or more custom monitoring classes are called and used to implement monitoring of network traffic, as indicated at block 710. In some embodiments, at least one custom class may be called via a first default class by replacing a second default class referenced in the first default class with a reference to the at least one custom class. At block 712, network traffic is monitored. For instance, network traffic can be monitored by way of a network monitor class or set of classes.

Figure 8:
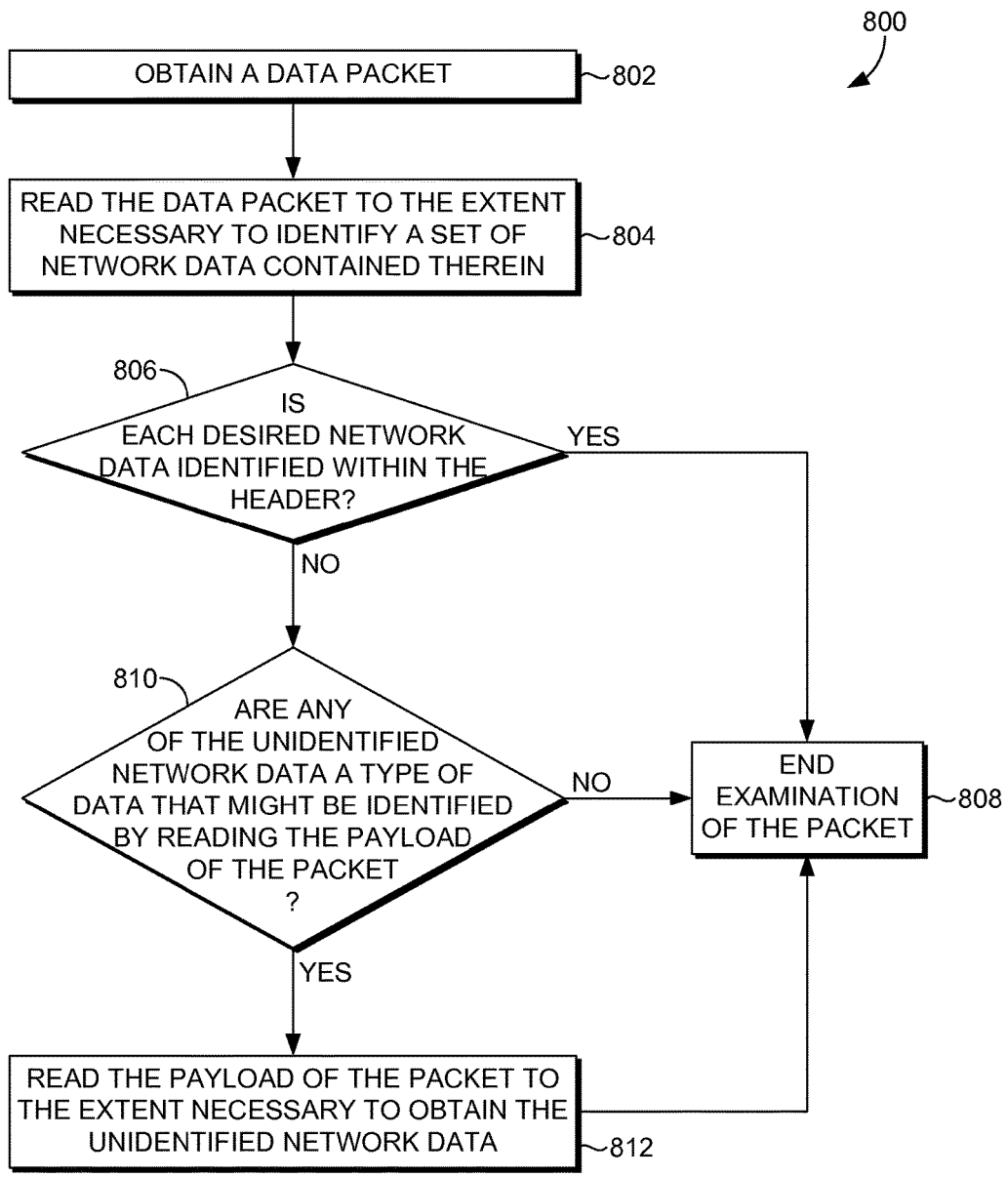
FIG. 8 is a flow diagram showing a method for monitoring network traffic in accordance with an embodiment of the present invention.

Turning now to FIG. 8, a flow diagram is provided that illustrates a method 800 for monitoring network traffic in accordance with an embodiment of the present invention. Initially, as indicated at block 802, a data packet is obtained. As can be appreciated, the data packet might be received from a remote application server or be a packet to be provided to a remote application server. At block 804, a header of the data packet is read to the extent needed to identify a set of network data contained therein. In some implementations, a packet header may be examined for a specific set of network data types. At block 806, it is determined whether each of the desired network data is identified within the header of the data packet. If so, examination of the packet is completed, as indicated at block 808. As can be appreciated, completion of packet examination may occur even before the header is completely read. For example, assume each of the desired network data is identified upon reading only half of the packet header. In such a case, the header examination can cease such that the entire packet header is not read. On the other hand, if each of the desired network data is not identified within the header of the data packet, at block 810, it is determined if any of the unidentified network data are a type of data that might be identified by reading the payload of the packet. As a specific example, it might be determined whether a packet size was identified via the packet header. If not, examination of the packet is completed, as indicated at block 808. However, if any of the unidentified network data may be identified by reading the packet payload, the packet payload is read to the extent necessary to obtain the unidentified network data. This is indicated at block 812. Thereafter, the method returns to block 808 at which examination of the packet ends.

Having described an overview of embodiments of the present invention, an exemplary operating environment in which embodiments of the present invention may be implemented is described below in order to provide a general context for various aspects of the present invention. Referring to FIG. 9 in particular, an exemplary operating environment for implementing embodiments of the present invention is shown and designated generally as computing device 900. The computing device 900 is but one example of a suitable computing environment and is not intended to suggest any limitation as to the scope of use or functionality of embodiments of the invention. Neither should the computing device 900 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

Figure 9:
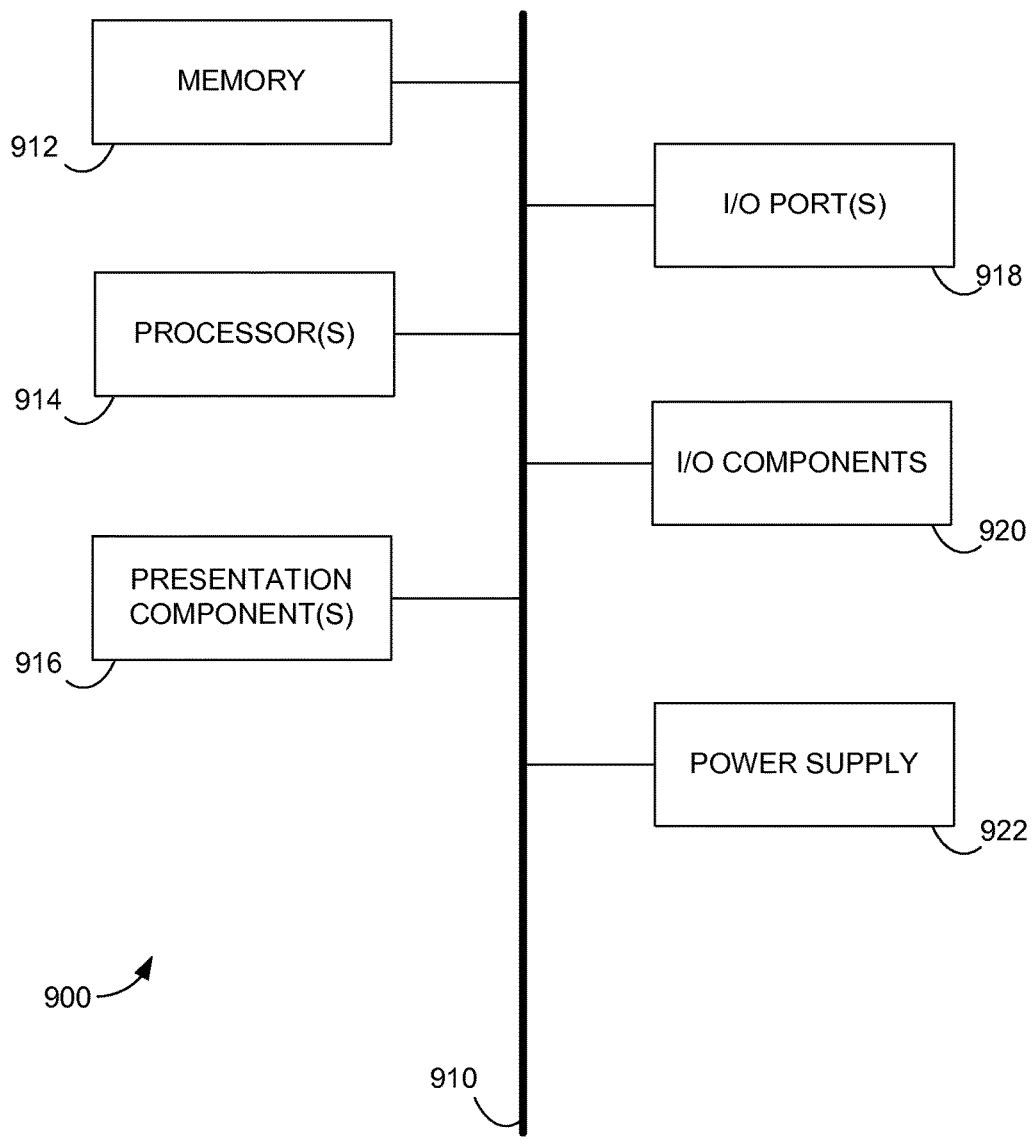
FIG. 9 is a block diagram of an exemplary computing environment suitable for use in implementing embodiments of the present invention.

With continued reference to FIG. 9, the computing device 900 includes a bus 910 that directly or indirectly couples the following devices: a memory 912, one or more processors 914, one or more presentation components 916, one or more input/output (I/O) ports 918, one or more I/O components 920, and an illustrative power supply 922. The bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 present data indications to a user or other device. Exemplary presentation components include a display device, speaker, printing component, vibrating component, etc. I/O ports 918 allow computing device 900 to be logically coupled to other devices including I/O components 920, some of which may be built in. Illustrative I/O components 920 include a microphone, joystick, game pad, scanner, hard/soft button, touch screen display, etc.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A method for monitoring network traffic, the method comprising:
    injecting, by a computing device using reflection, a call to one or more custom monitoring classes from an SDK generated by an analytics service provider into one or more default classes associated with an application, the one or more custom monitoring classes designed to facilitate monitoring data packets being communicated to or from the application on the computing device, and being unique from the one or more default classes originally developed for implementation;
    invoking the call to the one or more custom monitoring classes, by the one or more default classes upon the one or more default classes initiating a network connection, to facilitate monitoring a plurality of data packets communicated to or from the application via a network; and
    sequentially replacing default classes used to arrive at the one or more custom monitoring classes with a plurality of custom classes, each custom class modifying a corresponding one of the default classes, to initiate the one or more custom monitoring classes, wherein the one or more custom monitoring classes enable obtaining network data from one or more data packets being communicated to or from the application installed on the computing device by examining the one or more data packets.

2. The method of claim 1, wherein the computing device comprises a mobile device.

3. The method of claim 1, wherein the application comprises a mobile application.

4. The method of claim 1 further comprising initiating a monitoring component via the application installed on the computing device, wherein the monitoring component comprises a plug-in for the application.

5. The method of claim 4, wherein the monitoring component is initiated in accordance with the application being launched.

6. The method of claim 4, wherein the monitoring component is initiated via a network monitor trigger within code of the application that triggers activation of the monitoring component.

7. The method of claim 6, wherein the network monitor trigger comprises one line of code that triggers activation of the network monitor.

8. The method of claim 1, wherein the one or more custom monitoring classes further enable obtaining network data from one or more data packets being communicated to or from the application installed on the computing device by dismissing examination of an unread portion of the one or more data packets upon obtaining desired network data.

9. The method of claim 8, wherein the network data comprise data indicating information associated with the network.

10. The method of claim 9, wherein the network data are used to identify performance of the application.

11. The method of claim 8, wherein examining the one or more data packets comprises examining data packet headers only.

12. The method of claim 8, wherein examining the one or more data packets comprises examining data packet headers and only examining a data packet payload when data packet size was not identified from a corresponding data packet header.

13. The method of claim 1, wherein the one or more default classes initiate the network connection.

14. The method of claim 1, wherein the device comprises a mobile device having an Android-based platform.

15. A system for monitoring network traffic, the system comprising:
    one or more data processors; and
    one or more computer-readable storage media containing instructions which when executed on the one or more data processors, cause the one or more processors to perform operations including:

injecting, by a computing device using reflection, a call to one or more custom monitoring classes from an SDK generated by an analytics service provider into one or more default classes associated with an application, the one or more custom monitoring classes designed to facilitate monitoring data packets being communicated to or from the application on the computing device and being unique from the one or more default classes originally developed for implementation;

invoking the call to the one or more custom monitoring classes, by the one or more default classes upon the one or more default classes initiating a network connection to facilitate monitoring a plurality of data packets communicated to or from the application via a network; and sequentially replacing default classes used to arrive at the one or more custom monitoring classes with a plurality of custom classes, each custom class modifying a corresponding one of the default classes, to initiate the one or more custom monitoring classes, wherein the one or more custom monitoring classes enable obtaining network data from one or more data packets being communicated to or from the application installed on the computing device by examining the one or more data packets.

16. The system of claim 15, wherein the computing device comprises a mobile device.

17. The system of claim 15, wherein the application comprises a mobile application.

18. The system of claim 15 the operations further comprising initiating a monitoring component via the application installed on the computing device, wherein the monitoring component comprises a plug-in for the application.

19. The system of claim 18, wherein the monitoring component is initiated in accordance with the application being launched.

20. The system of claim 18, wherein the monitoring component is initiated via a network monitor trigger within code of the application that triggers activation of the monitoring component.

21. The system of claim 20, wherein the network monitor trigger comprises one line of code that triggers activation of the network monitor.

22. The system of claim 15, wherein the one or more custom monitoring classes further enable obtaining network data from one or more data packets being communicated to or from the application installed on the computing device by dismissing examination of an unread portion of the one or more data packets upon obtaining desired network data.

23. The system of claim 22, wherein the network data comprise data indicating information associated with the network.

24. One or more non-transitory computer-storage media storing computer-executable instructions that, when executed by a computing device, perform a method for monitoring network traffic, the method comprising:

injecting, by a computing device using reflection, a call to one or more custom monitoring classes from an SDK generated by an analytics service provider into one or more default classes associated with an application, the one or more custom monitoring classes designed to facilitate monitoring data packets being communicated to or from the application on the computing device, and being unique from the one or more default classes originally developed for implementation;

invoking the call to the one or more custom monitoring classes, by the one or more default classes upon the one or more default classes initiating a network connection, to facilitate monitoring a plurality of data packets communicated to or from the application via a network; and sequentially replacing default classes used to arrive at the one or more custom monitoring classes with a plurality of custom classes, each custom class modifying a corresponding one of the default classes, to initiate the one or more custom monitoring classes, wherein the one or more custom monitoring classes enable obtaining network data from one or more data packets being communicated to or from the application installed on the computing device by examining the one or more data packets.

25. The media of claim 24, wherein the computing device comprises a mobile device.

26. The media of claim 24 the method further comprising initiating a monitoring component via the application installed on the computing device, wherein the monitoring component comprises a plug-in for the application.

27. The system of claim 22, wherein examining the one or more data packets comprises examining data packet headers only.

* * * * *